May 4, 1926.
E. W. FARLEY
SEPTIC TANK
Filed May 1, 1923
1,582,915
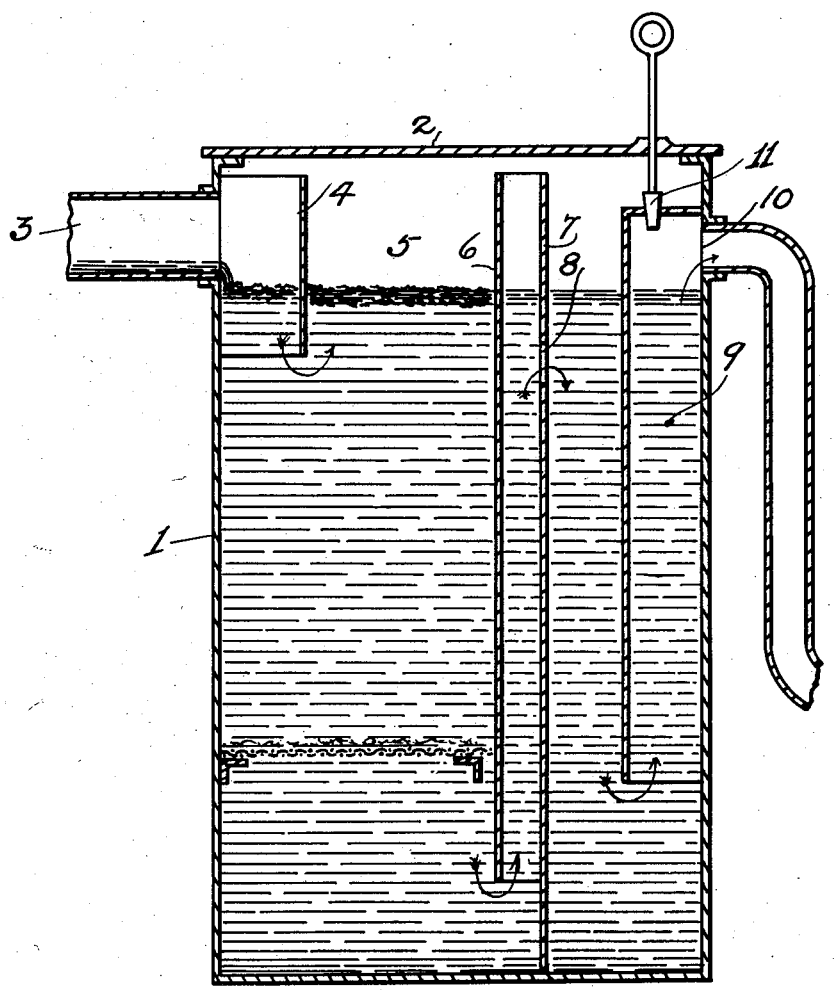
Inventor
Ernst W. Farley.
By Arthur Scrivenor.
Attorney Patented May 4, 1926.

1,582,915

UNITED STATES PATENT OFFICE.

ERNST W. FARLEY, OF RICHMOND, VIRGINIA.

SEPTIC TANK.

Application filed May 1, 1923. Serial No. 635,854.

*To all whom it may concern:*

Be it known that I, ERNST W. FARLEY, a citizen of the United States, residing at Richmond, in the county of Henrico and State of Virginia, have invented certain new and useful Improvements in Septic Tanks, of which the following is a specification, reference being had therein to the accompanying drawing.

The object of my invention is to provide a septic tank which shall be non-porous; which shall be inexpensive to build, and adapted to shipment to considerable distances; and which shall also offer the greatest resistance to the corrosive action of the sewage and other wastes which it is purposed to treat in it.

In the past septic tanks have been constructed of several kinds of material; such as brick, wood, concrete, iron, steel, etc. Brickwork was found to be too permeable; wood rapidly deteriorated. Steel and iron plate were then tried. These materials made tight, inexpensive, and easily transported tanks; but their life was comparatively short when subjected to the corrosive action of the acid and alkaline compounds to be found in sewage, and to the bacterial reactions taking place during the putrefying of the solids. To overcome the objections to the short life of such tanks, concrete, molded in place, was then largely used; and is used to this day, and for the same reason. Large septic tanks built up of concrete are much more costly than steel tanks of like capacity; the material for their construction must be shipped to the site, and they must be built in place; it is very difficult to stop leaks, which frequently exist around the pipe connections, inlets and outlets; the body of the tanks is permeable; voids in the walls are common; and the tanks are not portable. At the same time such concrete tanks, when well built, have been preferred to the steel tank for the reason noted. One of the functions of a septic tank is to provide a chamber or chambers in series in which the bacterial reactions may take place. Manifestly, if the wall or walls of the chamber or chambers is destroyed by corrosion, or even badly perforated, the function of the tank is also destroyed, and a menace is created.

I have discovered that the rapid corroding of the steel of the tank may be practically checked by alloying with the steel a small percentage of copper; approximately one quarter of one per cent.

The form of septic tank I have reference to is shown in the accompanying drawing; in which 1 is the body of the tank; 2 is the cover; 3 is the inlet for the sewage; 4 is a baffle to prevent the agitation of the surface of the sewage in the main chamber 5 by the inflowing sewage; 6 is a baffle attached to the dividing plate 7 and over the orifice 8; 9 is a closed baffle and outlet chamber covering the outlet 10, and in the top of which is the vacuum breaking valve 11. The lighter solids collect on the surface of the liquid in the main chamber 5, where their condition is changed by bacterial action; the said action continuing as the liquid passes through the chambers to the outlet 10, through which it may be discharged to irrigation beds or to other means for purification and for fertilization of the soil.

In a tank of ordinary steel the surface is protected to some extent by the application of a coating of some material such as asphaltum; but once this coating is broken, the rusting process begins, and the progress of the corrosion under the rust coat is rapid. A tank made of copper-steel may also be coated with paint, asphaltum or like material, if desired; but it has been found that where the surface of the copper-steel is exposed there forms a thin rust coat, and that this rust coat of the copper-steel itself forms such an efficient protective coating that the further corrosion of the metal is practically stopped.

Though the most efficient results have been obtained by alloying one quarter of one percent of copper with the steel, yet good results have been obtained with somewhat smaller and also somewhat larger percentages of copper. In ordinary steel the corrosion rate appears to be progressive, while with the copper-steel the rate of resistance to corrosion is progressive. In tests made to compare the corrosion of the ordinary steels with a copper-bearing steel it was found that the ordinary steel was practically destroyed in six months, while the copper-steel, though subjected to the same test conditions, was in practically as good condition in the sixth month as the ordinary steel was at the end of the first month; and it was also noted, by comparing the loss in metal from month to month, that the corrosion of the copper-steel was then practically arrested.

The use of copper-steel in the manufacture of my septic tanks permits me to use a design which has great advantages in the proper treatment of the sewage; but which design would not be as durable as would be a simpler one were I limited to the use of ordinary steels. At the same time, I do not limit myself to the particular design of septic tank illustrated and described herein, since it is obvious that this design may be modified without departing from the spirit of my invention.

In my copending application Ser. No. 578,106, filed July 28, 1922, I claim structural details of septic tanks.

I claim:—

1. A septic tank formed of an alloy consisting of copper and steel.

2. A septic tank formed of an alloy consisting of steel and approximately one quarter of one per cent of copper.

In testimony whereof I have hereunto affixed my signature.

ERNST W. FARLEY.